(12) United States Patent
Turner et al.

(10) Patent No.: US 7,626,632 B2
(45) Date of Patent: Dec. 1, 2009

(54) METHOD AND APPARATUS FOR CORRECTING DIGITAL IMAGES

(75) Inventors: Robert W. Turner, Federal Way, WA (US); Pauline Joe, Renton, WA (US); Mark A. Zenor, Graham, WA (US)

(73) Assignee: The Boeing Company, Chicago, IL (US)

( * ) Notice: Subject to any disclaimer, the term of this patent is extended or adjusted under 35 U.S.C. 154(b) by 1244 days.

(21) Appl. No.: 10/611,702

(22) Filed: Jun. 30, 2003

(65) Prior Publication Data

US 2004/0264918 A1 Dec. 30, 2004

(51) Int. Cl.
*H04N 5/238* (2006.01)
(52) U.S. Cl. ...................................... 348/364
(58) Field of Classification Search ............ 348/207.99, 348/207.1, 207.11, 222.1, 362–364
See application file for complete search history.

(56) References Cited

U.S. PATENT DOCUMENTS

| 4,313,678 | A |   | 2/1982  | Colvocoresses |
|-----------|---|---|---------|---------------|
| 4,683,496 | A |   | 7/1987  | Tom           |
| 4,864,127 | A |   | 9/1989  | Brame         |
| 5,101,276 | A | * | 3/1992  | Ohta ................. 348/221.1 |
| 5,949,914 | A |   | 9/1999  | Yuen          |
| 6,741,740 | B2|   | 5/2004  | Sunshine et al. |
| 6,937,774 | B1|   | 8/2005  | Specht et al. |
| 2003/0206240 | A1 | * | 11/2003 | Hyodo et al. ......... 348/333.03 |

* cited by examiner

*Primary Examiner*—Tuan Ho

(57) ABSTRACT

The present invention provides methods, systems, and computer-program products for correcting image streaking, light scattering, and other effects in digital images generated by multispectral sensors. An image frame, a plurality of image frames from the digital sensor when exposed to dark, and a plurality of image frames from the digital sensor when exposed to light are received. The received image frame is corrected based on the received plurality of image frames exposed to dark and the plurality of image frames exposed to light. The received image frames are enhanced based on characteristics of the digital sensor. Light scattering effects are removed from the corrected image frame based upon characteristics of the digital sensor.

38 Claims, 9 Drawing Sheets

METHOD AND APPARATUS FOR CORRECTING DIGITAL IMAGES

FIELD OF THE INVENTION

This invention relates generally to digital cameras and, more particularly, to electro-optic framing cameras.

RELATED APPLICATIONS

This application is related to concurrently-filed U.S. patent application Ser. No. 10/611,757, and U.S. patent application Ser. No. 10/611,703, all filed Dec. 15, 2006 and all hereby incorporated by reference.

BACKGROUND OF THE INVENTION

Homeland defense, environmental base-lining, emergency responses to natural and manmade disasters, agricultural analysis, and other change detection applications need an ability to acquire real-time, high-resolution spatial and multispectral imagery to support situational evaluation of an environment. In order to effectively and efficiently support situational evaluation, multispectral image generation must be accurate and attainable at a minimum cost. For homeland security and environmental monitoring, low cost multispectral sensors can be used to generate digital multispectral images. However, digital images generated by multispectral sensors, such as electro-optic framing cameras, may contain image streaking caused by electronic noise of the sensor. The streaking results in a decrease in the radiometric accuracy of images. Therefore, removal of streaking effects is important for producing more radiometrically accurate images.

Multispectral sensors or digital cameras with electronic shutters, such as a Phillips liquid crystal device or other cameras with frame store devices, cause light scattering that also reduces the radiometric accuracy of an image.

Therefore, there exists an unmet need to produce low-cost, radiometrically accurate images.

SUMMARY OF THE INVENTION

The present invention provides methods, systems, and computer-based program products for correcting image streaking, light scattering, and other effects in digital images generated by multispectral sensors.

According to exemplary embodiments of the present invention, an image frame (i.e., the image frame is what a user desires to view), a plurality of image frames from the digital sensor when exposed to dark, i.e. light below a predefined luminance level, and a plurality of image frames from the digital sensor when exposed to light above a predefined luminance level are received. The received image frame is corrected based on the received plurality of image frames exposed to dark and the plurality of image frames exposed to light.

In accordance with further aspects of the invention, each image frame includes a plurality of frame units. A mean value for each frame unit of the plurality of image frames exposed to dark and a mean value for each frame unit of the plurality of image frames exposed to light are calculated. A first image frame is generated by subtracting the calculated mean value for each frame unit of the plurality of image frames exposed to dark from the corresponding frame unit in the received image frame. A second image frame is generated by subtracting the calculated mean value for each frame unit of the plurality of image frames exposed to dark from the calculated mean value for each corresponding frame unit of the plurality of image frames exposed to light. A third image frame is generated by dividing each frame unit in the first image frame from the corresponding frame unit in the second image frame. An average of frame units is calculated within a predefined center section of the second image frame. A fourth image frame is generated by multiplying each frame unit in the third image frame by the calculated average of the center section frame units, thereby producing a corrected image frame of the received image frame.

In accordance with other aspects of the present invention, all the received image frames are enhanced based on characteristics of the digital sensor. Enhancing a region of interest is determined based on evaluating a masked region of the digital sensor, which prevents light from reaching the sensor detectors. A standard deviation of the frame units is determined for a determined region of interest within the masked region. A threshold value is determined based on the determined standard deviation. A mean of the frame units in the determined region of interest that are below the determined threshold value is determined. Enhanced image frames are generated based on the determined mean of the frame units and a coefficient.

In accordance with still further aspects of the present invention, light scattering effects are removed from the corrected image frame based upon characteristics of the digital sensor. The characteristics of the digital sensor include light scattering effects of each frame unit upon each frame unit. Light scattering effects are based upon distance between the respective frame units.

BRIEF DESCRIPTION OF THE DRAWINGS

The preferred and alternative embodiments of the present invention are described in detail below with reference to the following drawings.

DETAILED DESCRIPTION OF THE INVENTION

The present invention provides methods, systems, and computer-based products for correcting image streaking, light scattering, and other effects in digital images generated by multispectral sensors.

Figure 1:
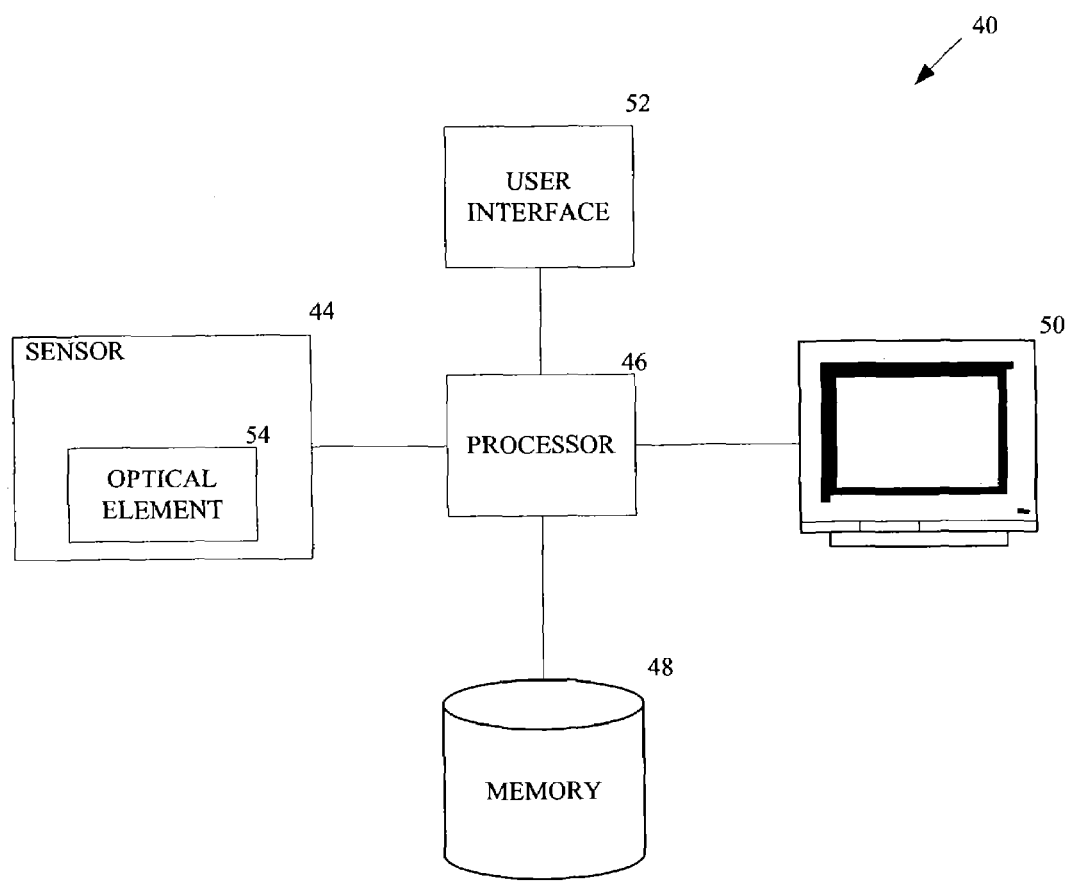
FIG. 1 is a block diagram of an exemplary system formed in accordance with the present invention.

FIG. 1 illustrates an exemplary system 40 for producing radiometrically accurate images. The system 40 includes a sensor 44, a processor 46, memory 48, a display 50, and a user interface 52. The processor 46 is suitably coupled to the sensor 44, the memory 48, the display 50, and the user interface 52. Non-limiting examples of the sensor 44 are multispectral sensors, digital cameras, electro-optic framing cameras, and cameras that include frame store devices (i.e., charge coupled device (CCD)), such as that produced by Phillips. The sensor 44 includes an optical element 54, such as an electronic shutter, that causes light scattering. The sensor 44 is typically used in aircraft to take pictures of the ground. Non-limiting examples of the user interface 52 are a keyboard, a mouse, or other input device for allowing a user to interact with the processor 46. The sensor 44 generates an image frame array (i.e., image or sensor information) and sends the image frame array to the processor 46 for correction. The processor 46 adjusts the received digital image frame array to compensate for previously-determined noise of the sensor 44 and light scattering effects of the optical element 54. The processor 46 then generates an image based on the corrected image frame array and sends the generated image to the display 50 for presentation. It will be appreciated that the components shown in FIG. 1 can be included within a single device or may be remotely located from one another over a network and in separate devices. It will be appreciated that the components of the system 40 are common off-the-shelf components and an explanation of these components is not necessary for understanding of the present invention.

A computer-program product resides on a computer readable medium for removing light scattering effects from an image frame generated by a digital sensor. The computer-program product comprises multiple components for removing the scattering effects.

Figure 2:
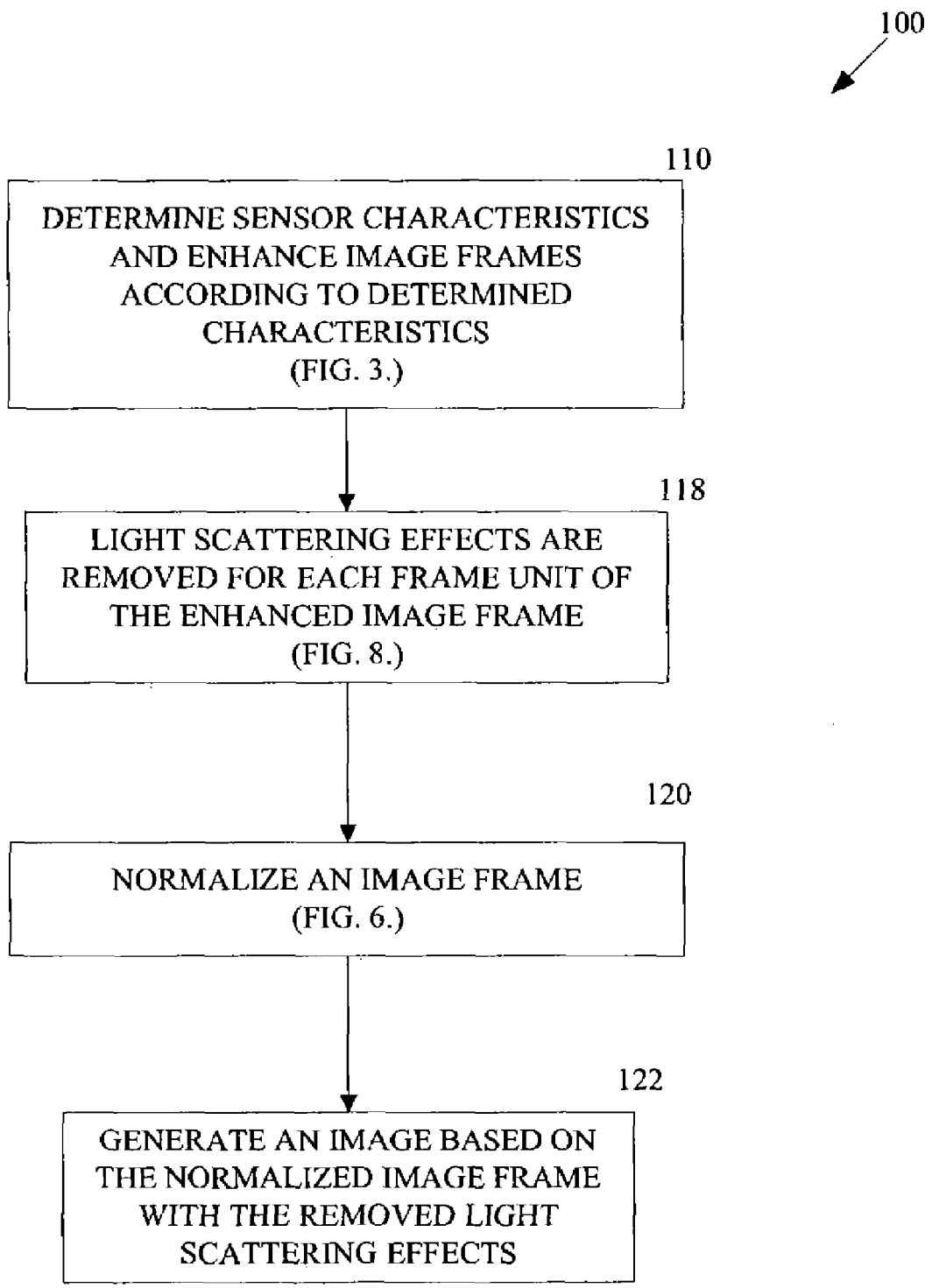
FIGS. 2-5, and 8 are flow diagrams of an exemplary process performed by the system shown in FIG. 1.

Referring now to FIG. 2, an exemplary process 100 is performed by the processor 46 (FIG. 1). At a block 110, characteristics of a sensor 44 are determined and images generated by the sensor 44 are enhanced according to the determined characteristics. The determination of sensor characteristics and adjustment of the image frames produced by the sensor 44 are described in more detail below in FIG. 3. At a block 118, light scattering effects are removed from the enhanced image frame. The removal of light scattering effects is illustrated in more detail below in FIG. 8. At a block 120, the image frame is normalized. Normalization is described in more detail below in FIG. 6. At a block 122, the processor 46 generates an image based on the normalized image frame with the removed light scattering effects and sends the generated image to the display 50 for presentation or to the memory 48 for storage.

Figure 3:
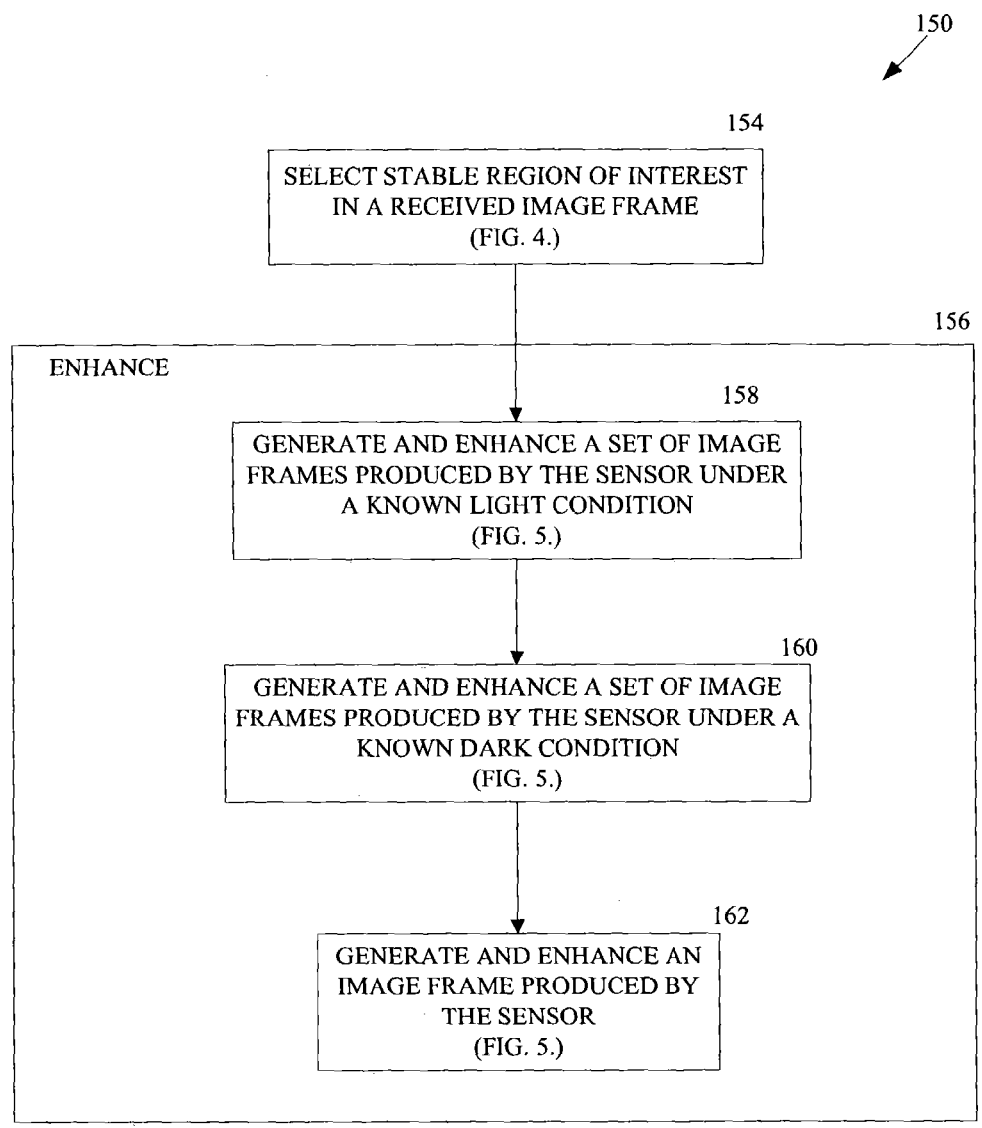

Referring now to FIG. 3, an exemplary process 150 determines characteristics of the sensor 44 and enhances image frames based on the determined sensor characteristics from the block 110 (FIG. 2). Image frames generated by the sensor 44 are produced at a predefined interval and are sized based on the array of sensing elements of the sensor 44. The array of sensing elements produces an array of frame unit data (hereinafter frame unit). The array of frame unit data is an image frame. Each frame unit includes a radiation value (i.e., radiance). At a block 154, a stable region of interest is selected from a mask region of an array of sensing elements of the sensor 44. Selection of the stable region of interest is shown in more detail below in FIG. 4. At a block 156, the image frames used in normalization at the block 120 (FIG. 2) are enhanced using information from the selected stable region of interest. The block 156 includes a block 158 that generates and enhances a set of image frames produced by the sensor 44 being exposed to a known light quantity. The frames exposed to light are created by having the sensor face a calibration device called an integrating sphere, which produces a uniform light source of know intensity. At a block 160, a set of image frames produced by the sensor 44 being exposed to dark are generated and enhanced. Exposing the sensor 44 to dark includes placing a lens cover over the sensor 44. At a block 162, an image frame generated by the sensor 44 is enhanced. The enhancement that is performed at the blocks 158, 160, and 162 is shown in more detail in FIG. 5. The results of the process 150 (FIG. 3) are enhanced image frames, which include an enhanced desired image frame, enhanced dark exposed frames, and enhanced frames exposed to the known light quantity. Exposing the sensor 44 to light and dark and enhancing the light and dark frames are suitably performed under test conditions possibly by the sensor manufacturer before product delivery or could be performed by a user before operation of the sensor 44.

Figure 4:
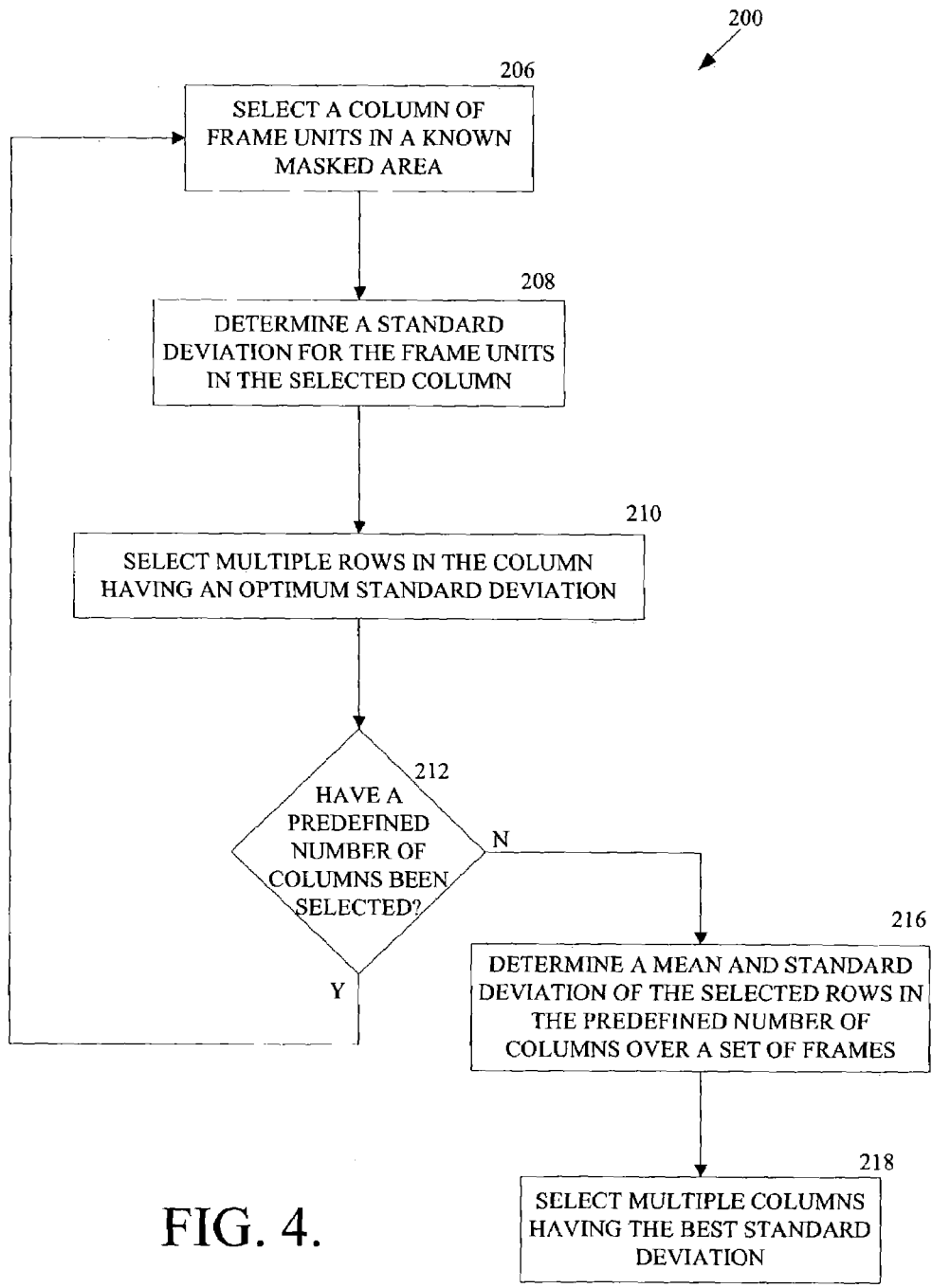

Referring now to FIG. 4, an exemplary process 200 selects a stable region of interest from the block 154 (FIG. 3). At a block 206, using an image frame produced by the sensor 44 under a known dark condition (i.e., exposed to dark), a column of frame units of the frame image is selected from a known mask area of the sensor 44. The known mask area is suitably an area near an edge of the sensor 44 where sensing elements are permanently masked or covered by a structure of the sensor 44. In one non-limiting example, the mask area suitably is around 20 frame unit columns wide and around 1,024 frame unit rows high. At a block 208, a standard deviation for the frame units in the selected columns is determined. At a block 210, the rows in the selected column that exhibit a desirable standard deviation are selected. In one non-limiting example, the rows selected start at row 100 and end at row 900. At a decision block 212, the process 200 returns to the block 206 if it is determined that a predefined number of columns have not been selected. If at the decision block 212 a predefined number of columns have been selected, at a block 216 a mean and standard deviation for the selected rows and columns are determined over a set number of frames. In one non-limiting example, the number of frames that are used is between 100 and 1000. At a block 218, columns exhibiting the desirable standard deviation over the set of frames are selected. The selections performed in the process 200 are suitably performed by a user analyzing the determined standard deviation information to determine the desirable rows and columns to select. It will be appreciated that the selections performed in the process 200 may be performed automatically by an application program executed by the processor 46.

Figure 5:
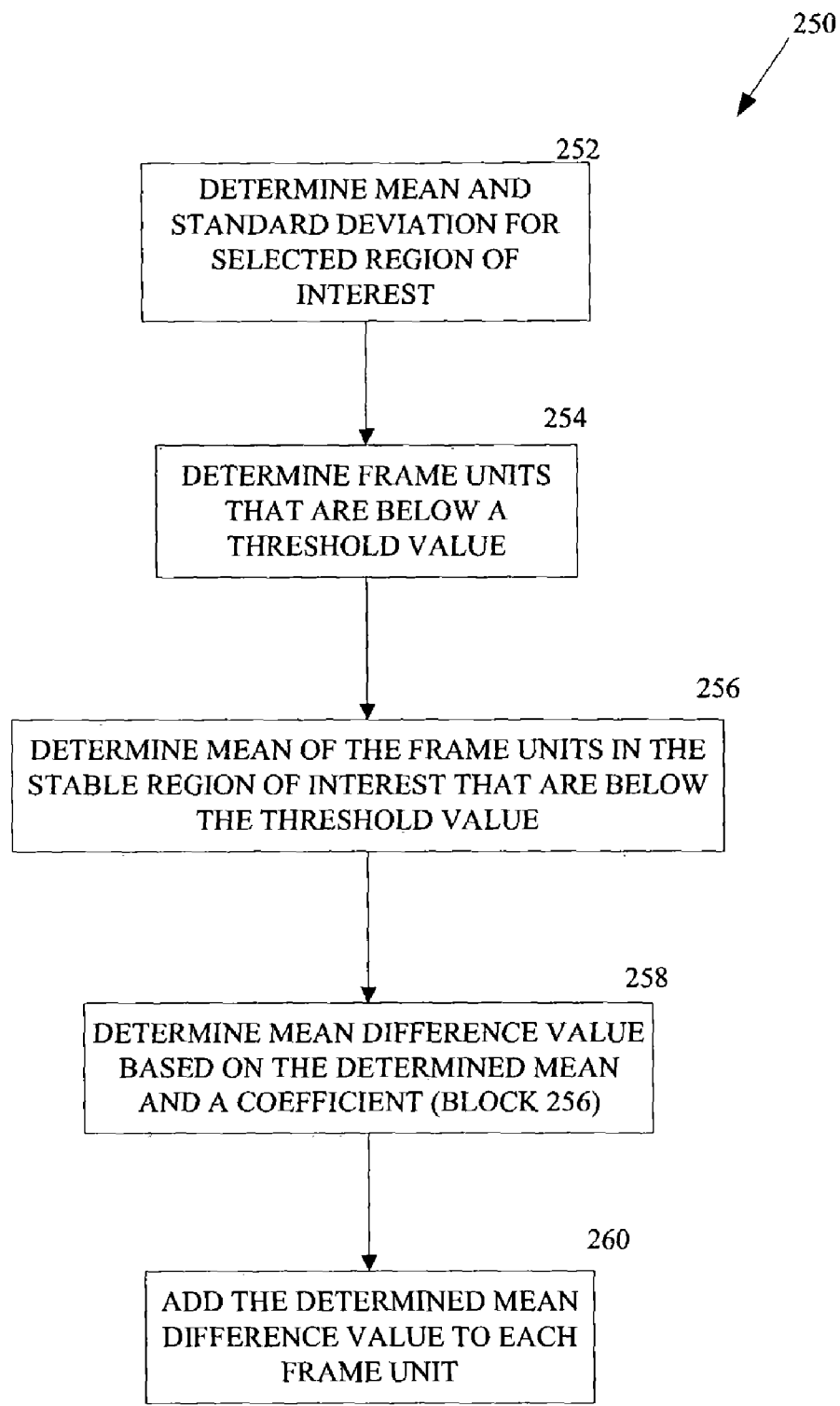

Referring now to FIG. 5, an exemplary process 250 enhances received image frames as shown in the block 156 (FIG. 3). At a block 252, for each image frame produced by the sensor 44, a mean and a standard deviation are determined for the frame units within the selected region of interest in the masked area. At a block 254, a determination is made for the frame units of a produced image frame within the masked area that are below a predefined threshold value. In one non-limiting example, the predefined threshold value suitably is around 6 times the determined standard deviation for the frame image added to the determined mean (mean+(6×standard deviation)). At a block 256, the mean is determined only for the frame units below the threshold value. At a block 258, a mean difference value is determined based on the determined mean of each frame unit below the threshold value and a predefined offset coefficient. This is performed on each frame separately. This allows removal of time varying components from the image. The offset coefficient is applied to allow noise variations around the dark zero value. In one non-limiting example, the determined mean is subtracted from coefficient=150 for determining the mean difference value. This coefficient is an electrical offset. The offset is used because there exists noise when the sensor is tested under the dark condition. It will be appreciated that other coefficient values may be used. At a block 260, the determined mean difference value is added to each frame unit in the frame image. The process 250 repeats for every frame image. The results of the block 260, are returned to the respective blocks 158, 160, and 162 within the enhanced block 156 (FIG. 3).

Figure 6:
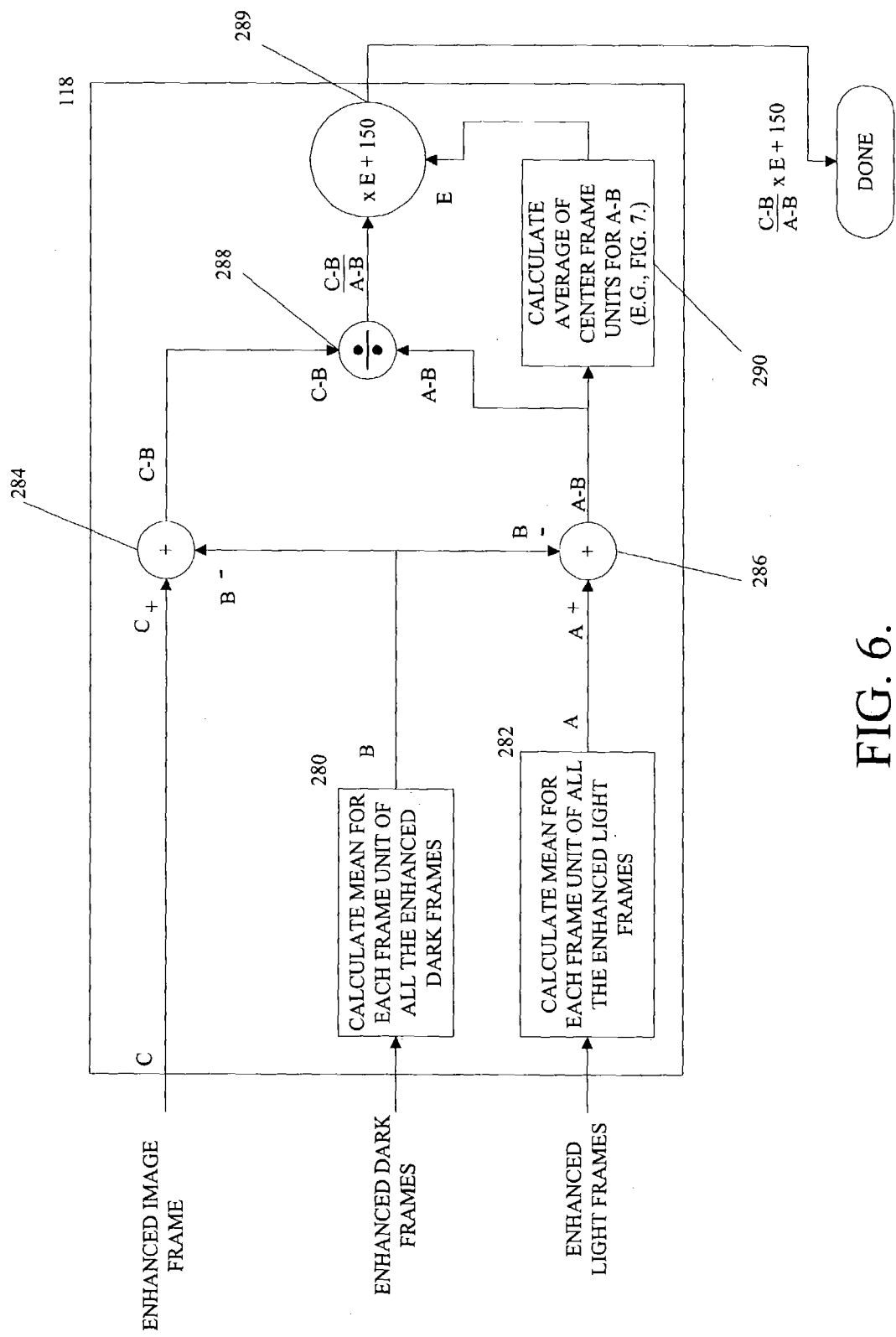
FIG. 6 illustrates aspects of the process shown in FIG. 4.

FIG. 6 illustrates normalization from the block 120 (FIG. 2). At a block 280, a mean is calculated for each frame unit across all of the enhanced image frames associated with the dark condition. The result of the block 280 is identified as B.

At a block 282, the mean is calculated for each frame unit of the enhanced image frames exposed to the known light condition. The output of the block 282 is identified as A. The calculated mean B for each frame unit is subtracted from the corresponding frame unit in the enhanced image frame (i.e. array of frame units of the image frame) C at a function 284. The calculated mean B for each frame unit is subtracted from the corresponding frame unit in the calculated mean A at a function 286, thereby removing the mean dark values from the image frames. At a function 288, the enhanced image C−B is divided by the mean image frame based on the known light condition as follows: C−B/A−B. At a block 290, an average value for the frame units in a predefined center area of the frame image A−B is calculated. The calculated average value is identified as E. At a function 289, the result of the function 288 is multiplied by the calculated average E and then added to a coefficient. A non-limiting example of the coefficient that is added is 150. Thus, the results of normalization are as follows:

(C−B/A−B)×E+150

Figure 7:
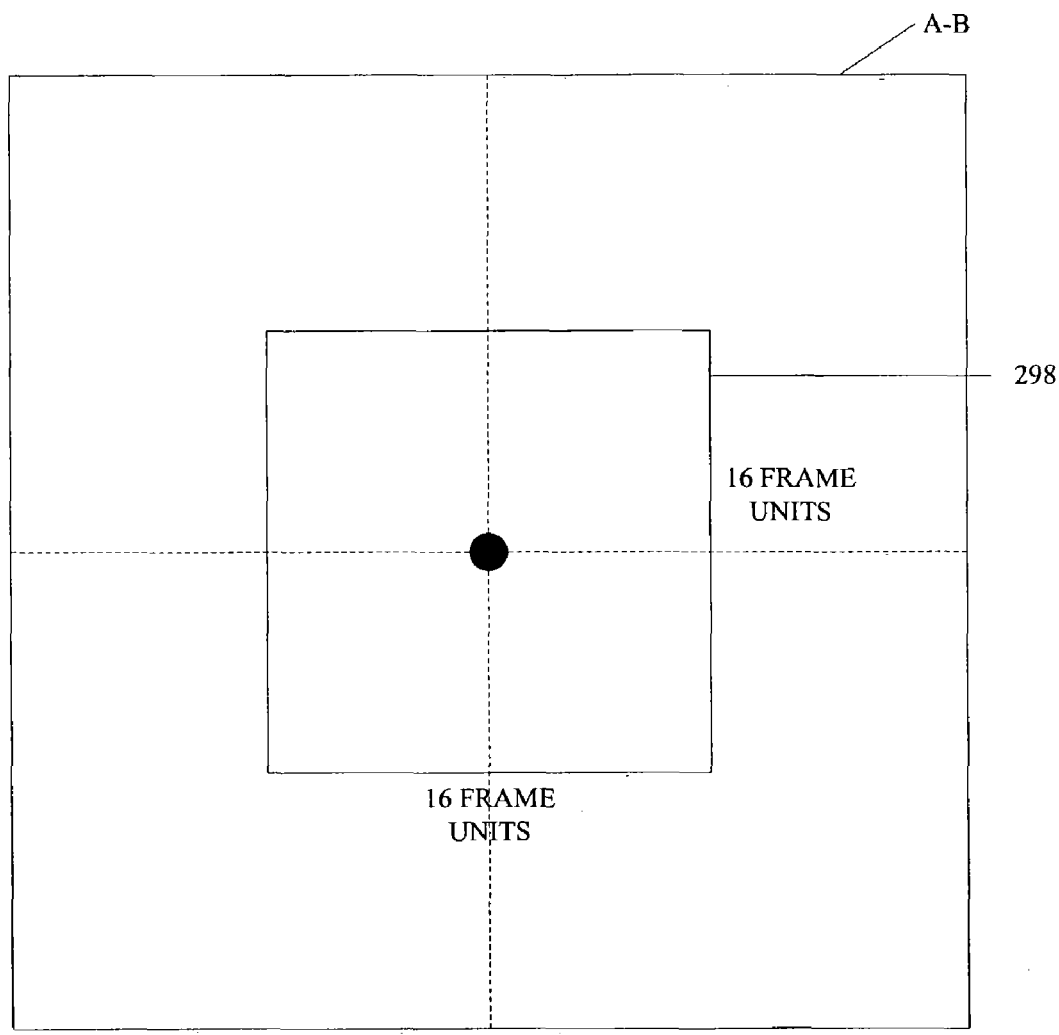
FIG. 7 illustrates image graphics as it relates to a portion of the process of FIG. 6.

FIG. 7 illustrates an image frame A−B, and an area 298 identifies the frame units that are used for the calculation of the average done in the block 290 (FIG. 6). In one non-limiting example, the area 298 is 16 frame units by 16 frame units.

In one embodiment, the original raw data included within the selected region of interest from the received image frame (block 110) is reinserted back into the normalized image frame.

Figure 8:
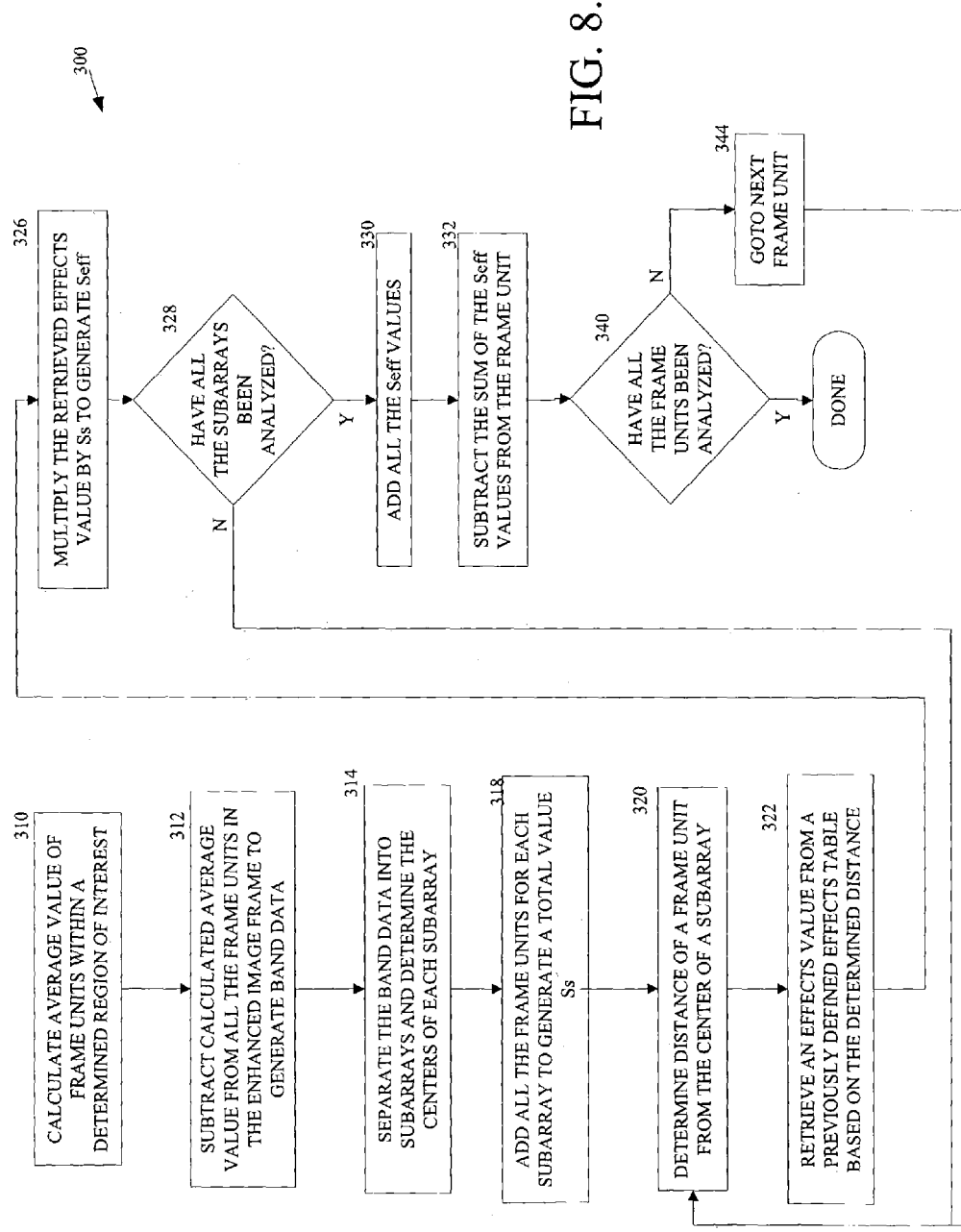

Referring now to FIG. 8, an exemplary process 300 adjusts light scattering effects resulting from an optical element 54, such as without limitation an electronic shutter, within the sensor 44. The process 300 is performed at the block 118 (FIG. 2). At a block 310, the average values of the frame units within the previously-determined region of interest of the enhanced image frame are calculated. At a block 312, the calculated average for all of the frame units is subtracted from each of the frame units in the enhanced image frame. The image frame result of the subtraction at the block 312 is considered band data. At a block 314, the band data is separated into subarrays of a predefined area and the centers for each of the subarray are determined. At a block 318, all the frame units for each subarray are totaled thereby generating a total $S_S$ for each subarray. At a block 320, the distance of a frame unit from the center of a subarray is determined. At a block 322, a previously calculated effects value is retrieved from an effects table. The effects table includes light scattering values that indicate each frame unit's effect on each frame unit, which have been determined by measurement of camera characteristics. A frame unit's effect on other frame units is based on light scattering properties of the optical element 54. At a block 326, the retrieved effects value is multiplied by the associated subarray total $S_S$, thereby generating an effects value $S_{eff}$. At a decision block 328, the process 300 returns to the block 320 if it is determined that not all of the subarrays have been analyzed for a frame unit. If all the subarrays for a frame unit have been analyzed, at a block 330 all the effects values $S_{eff}$ are totaled for a particular frame unit. At a block 332, the sum of the $S_{eff}$ values is subtracted from the same frame unit. At a decision block 340, if it is determined that not all of the frame units have been analyzed with respect to all of the subarrays, at a block 344 the process 300 moves to the next frame unit and returns to the block 320 to repeat until all of the frame units have been analyzed. If it is determined that all the frame units have been analyzed, the process 300 is complete.

Figure 9:
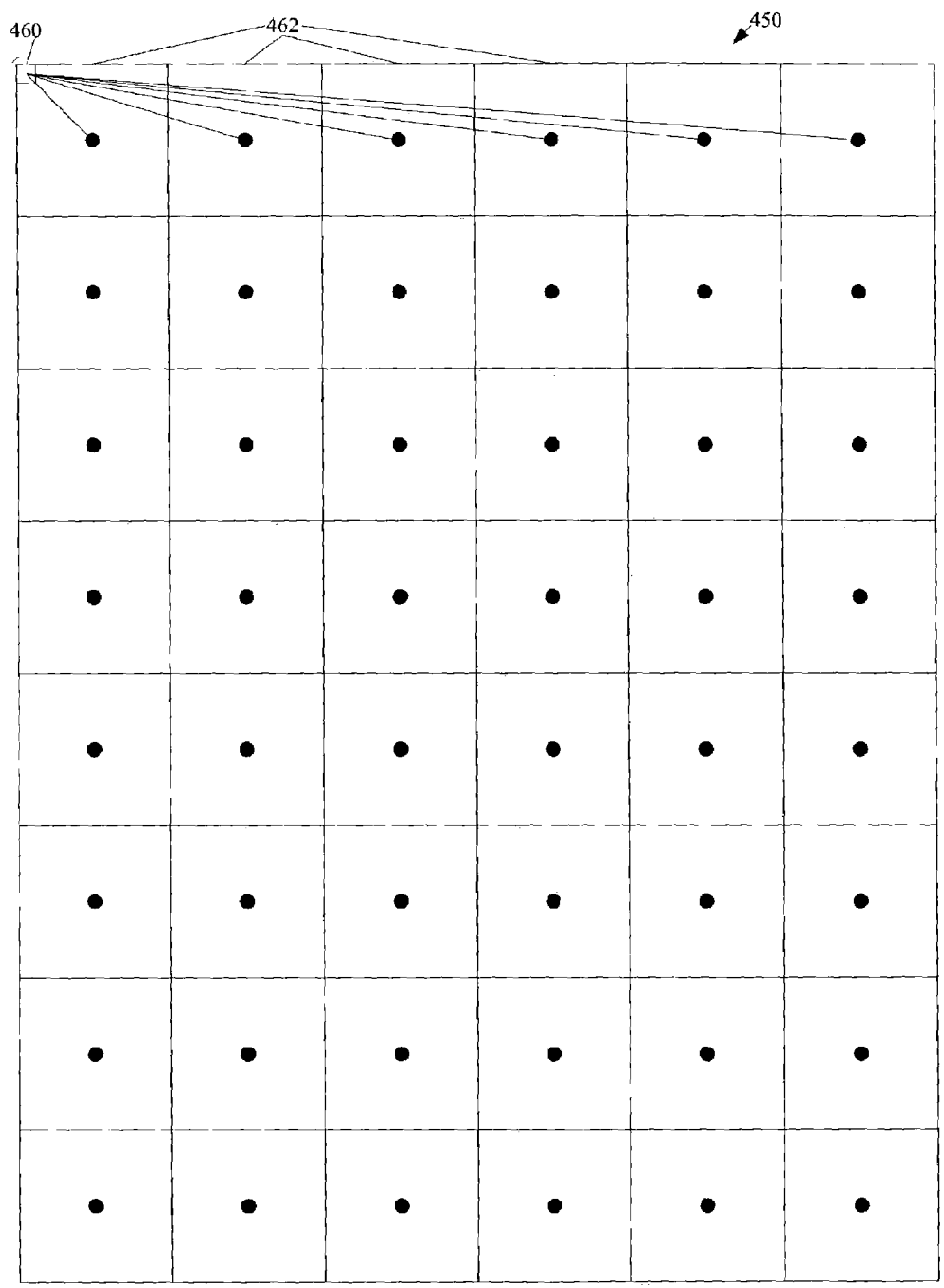
FIG. 9 is a graphical example of some of the processing performed in the process of FIG. 8.

FIG. 9 illustrates some of the processing of the process 300 (FIG. 8) applied to an enhanced image frame 450. Distances from a first frame unit 460 to centers of each subarray 462 are determined. The determined distance value is suitably compared to distances stored in a look-up table that is stored in the memory 48. The look-up table includes all possible distances between frame units 460 and a corresponding light scattering effects value. A retrieved light scattering effects value is multiplied by the sum of all frame units within the respective subarray. The product produces a relative light scattering effect of the subarray on the frame unit 460. The products for all of the subarrays are added together and then subtracted from the frame unit 460, thereby canceling out the light scattering effects of all the subarrays upon the frame unit 460. It will be appreciated that other methods of canceling out the light scattering effects of frame units upon other frame units can be used. For example, the process 300 described above can be performed for determining the direct light scattering effect of every frame unit upon each frame unit.

The $S_S$ and scattering effects are fractional numbers requiring floating point numbers.

The process for removing light scattering effects may be performed on the enhanced image frames that were exposed to light.

It will be appreciated that a frame image may be corrected in real-time if enough processing power is provided. Thus, with real-time image generation streaming images (video) are possible.

While the preferred embodiment of the invention has been illustrated and described, as noted above, many changes can be made without departing from the spirit and scope of the invention. For example, the steps of the processes described above may be performed in a different order and still accomplish the same or similar final results. Accordingly, the scope of the invention is not limited by the disclosure of the preferred embodiment. Instead, the invention should be determined entirely by reference to the claims that follow.

What is claimed is:

1. A method for correcting an image frame, the method comprising:
   receiving a first image frame of a scene from a digital sensor;
   receiving a first plurality of image frames from the digital sensor exposed to a dark current level;
   receiving a second plurality of image frames from the digital sensor exposed to a reference intensity level;
   computing a difference between the first plurality of images and the second plurality of images over a stable region of interest; and
   using the difference to correct the first image frame for light scattering.

2. A method for correcting an image frame, the method comprising:
   receiving a first image frame from a digital sensor;
   receiving a plurality of image frames from the digital sensor exposed to light below a first predefined luminance level;
   receiving a plurality of image frames from the digital sensor exposed to light above a second predefined luminance level; and
   correcting the first received image frame based on the received plurality of image frames exposed to light below the first predefined luminance level and the plurality of image frames exposed to light above the second predefined luminance level;
wherein each image frame includes a plurality of frame units and correcting includes calculating a mean value for each frame unit of the plurality of image frames exposed to light below the first predefined luminance level; calculating a mean value for each frame unit of the plurality of image frames exposed to light above the second predefined luminance level; generating a second image frame by subtracting the calculated mean value for each frame unit of the plurality of image frames exposed to light below the first-predefined luminance level from the corresponding frame unit in the first image frame; generating a third image frame by subtracting the calculated mean value for each frame unit of the plurality of image frames exposed to light below the first predefined luminance level from the calculated mean value for each corresponding frame unit of the plurality of image frames exposed to light above the second predefined luminance level; generating a fourth image frame by dividing each frame unit in the second image frame from the corresponding frame unit in the third image frame; calculating an average of frame units within a predefined center section of the third image frame; and generating a fifth image frame by multiplying each frame unit in the fourth image frame by the calculated average of the center section frame units, thereby producing a corrected image frame of the received image frame.

3. The method of claim 2, wherein generating a fifth image frame includes adding a first predefined constant value.

4. The method of claim 3, wherein the first constant value is around 150 based on sensor testing and characterizations.

5. The method of claim 1, wherein receiving the image frames includes enhancing the image frames based on characteristics of the digital sensor.

6. A method for correcting an image frame, the method comprising:
  receiving a first image frame from a digital sensor;
  receiving a plurality of image frames from the digital sensor exposed to light below a first predefined luminance level;
  receiving a plurality of image frames from the digital sensor exposed to light above a second predefined luminance level; and
  correcting the first received image frame based on the received plurality of image frames exposed to light below the first predefined luminance level and the plurality of image frames exposed to light above the second predefined luminance level;
  wherein receiving the image frames includes enhancing the image frames based on characteristics of the digital sensor; and
  wherein enhancing the image frames includes determining a region of interest based on a masked region of the digital sensor; determining a standard deviation of the frame units for the determined region of interest; determining a threshold value based on the determined standard deviation; determining a mean of the frame units in the determined region of interest that are below the determined threshold value; and generating enhanced image frames based on the determined mean of the frame units.

7. The method of claim 6, wherein generating enhanced image frames includes: determining a mean difference value based on the determined mean of the frame units and a predefined coefficient; and adding the determined mean difference value to each frame unit of the corresponding image frame.

8. The method of claim 7, wherein determining a mean difference value includes subtracting the determined mean of the frame units from 150.

9. The method of claim 6, wherein determining a threshold value includes multiplying the determined standard deviation by a second constant value.

10. The method of claim 9, wherein the second constant value is around 6.

11. The method of claim 5, wherein receiving the first image frame includes removing light scattering effects from a portion of the enhanced image frame based upon light scattering properties.

12. The method of claim 11, wherein the light scattering properties include light scattering effects of the frame units upon all other frame units based upon distance between the respective frame units.

13. The method of claim 12, wherein removing light scattering effects includes:
  a) calculating an average value of frame units within the determined region of interest;
  b) generating a second image frame and by removing the calculated average value from each of the frame units of the enhanced first image frame;
  c) separating the second image frame into a plurality of subarrays;
  d) generating a total for each subarray by adding all the frame units of the respective subarray;
  e) determining a distance of a frame unit of the second image frame from one of the subarrays;
  f) determining the light scattering effect of the subarray upon the frame unit based upon the determined distance of the frame unit from the subarray and predetermined light scattering characteristics;
  g) generating a subarray light scattering effect by multiplying the determined light scattering effect by the generated total of the associated subarray;
  h) repeating e)-g) for all the subarrays;
  i) generating a subarray effects total by adding all the generated subarray light scattering effects;
  j) generating a final frame unit by subtracting the generated subarray effects total from the respective frame unit; and
  k) repeating e)-j) for all the frame units of the second image frame.

14. A system for correcting an image frame produced by a digital sensor, the system comprising a processor programmed to receive a first image frame from the digital sensor, a plurality of image frames exposed to light below a first predefined luminance level, and a plurality of image frames exposed to light above a second predefined luminance level; and to correct the first image frame for light scattering based on a difference between the received plurality of image frames exposed to light below the first predefined luminance level and the plurality of image frames exposed to light above the second predefined luminance level.

15. The system of claim 14, wherein each image frame includes a frame unit and wherein the the processor is programmed to:
  calculate a mean value for each frame unit of the plurality of image frames exposed to light below the first predefined luminance level;
  calculate a mean value for each frame unit of the plurality of image frames exposed to light above the second predefined luminance level;
  generate a second image frame by subtracting the calculated mean value for each frame unit of the plurality of image frames exposed to dark from the corresponding frame unit in the first image frame;
  generate a third image frame by subtracting the calculated mean value for each frame unit of the plurality of image frames exposed to light below the first predefined luminance level from the calculated mean value for each corresponding frame unit of the plurality of image frames exposed to light above the second predefined luminance level;

generate a fourth image frame by dividing each frame unit in the second image frame from the corresponding frame unit in the third image frame;

calculate an average of frame units within a predefined center section of the third image frame; and generate a fifth image frame by multiplying each frame unit in the fourth image frame by the calculated average of the center section frame units, thereby producing a corrected image frame of the received image frame.

16. The system of claim 14, wherein the image frames are enhanced based on characteristics of the digital sensor.

17. The system of claim 16, wherein enhancing the image frames includes: determining a region of interest based on a masked region of the digital sensor; determining a standard deviation of the frame units for the determined region of interest; determining a threshold value based on the determined standard deviation; determining a mean of the frame units in the determined region of interest that are below the determined threshold value; and generating enhanced image frames based on the determined mean of the frame units.

18. The system of claim 17, wherein a mean difference value based on the determined mean of the frame units and a predefined coefficient is computed; and the mean difference value is added to each frame unit of the corresponding image frame.

19. The system of claim 18, wherein the predefined coefficient is about 150 based on sensor testing and characterizations.

20. The system of claim 17, wherein the threshold value is determined by multiplying the determined standard deviation by a second constant value.

21. The system of claim 20, wherein the second constant value is around 6.

22. The system of claim 16, wherein light scattering effects are removed from the enhanced image frame based upon light scattering properties.

23. The system of claim 22, wherein the light scattering properties include light scattering effects of the frame units upon all other frame units based upon the distance between the respective frame units.

24. The system of claim 23, wherein removing the light scattering effects includes:
a) calculating an average value of frame units within the determined region of interest;
b) generating a second image frame by removing the calculated average value from each of the frame units of the enhanced first image frame;
c) separating the second image frame into a plurality of subarrays;
d) generating a total for each subarray by adding frame units of the respective subarray;
e) determining a distance of a frame unit of the second image frame from one of the subarrays;
f) determining the light scattering effect of the subarray upon the frame unit based upon the determined distance of the frame unit from the subarray and predetermined light scattering characteristics;
g) generating a subarray light scattering effect by multiplying the determined light scattering effect by the generated total of the associated subarray;
h) repeating e)-g) for all the subarrays;
i) generating a subarray effects total by adding all the generated subarray light scattering effects;
j) generating a final frame unit by subtracting the generated subarray effects total from the respective frame unit; and
k) repeating e)-j) for all the frame units of the second image frame.

25. An article comprising a computer readable medium and a computer-program product residing on the computer readable medium for correcting an image frame produced by a digital sensor, including:

receiving a first image frame, a plurality of image frames exposed to light below a first predefined luminance level, and a plurality of image frames exposed to light above a second predefined luminance level; and correcting the first image frame for light scattering based on a difference between the received plurality of image frames exposed to light below the first predefined luminance level and the plurality of image frames exposed to light above the second predefined luminance level.

26. The article of claim 25, wherein
each image frame includes a frame unit and wherein correcting the first image includes:
calculating a mean value for each frame unit of the plurality of image frames exposed to light below the first predefined luminance level;
calculating a mean value for each frame unit of the plurality of image frames exposed to light above the second predefined luminance level;
generating a second image frame by subtracting the calculated mean value for each frame unit of the plurality of image frames exposed to light below the first predefined luminance level from the corresponding frame unit in the first image frame;
generating a third image frame by subtracting the calculated mean value for each frame unit of the plurality of image frames exposed to light below the first predefined luminance level from the calculated mean value for each corresponding frame unit of the plurality of image frames exposed to light the second predefined luminance level;
generating a fourth image frame by dividing each frame unit in the second image frame from the corresponding frame unit in the third image frame;
calculating an average of frame units within a predefined center section of the third image frame; and
generating a fifth image frame by multiplying each frame unit in the fourth image frame by the calculated average of the center section frame units, thereby producing a corrected image frame of the received image frame.

27. The article of claim 25, wherein the image frames is enhanced based on characteristics of the digital sensor.

28. The article of claim 27, wherein enhancing the image frames includes determining a region of interest based on a masked region of the digital sensor; determining a standard deviation of the frame units for the determined region of interest; determining a threshold value based on the determined standard deviation; determining a mean of the frame units in the determined region of interest that are below the determined threshold value; and generating enhanced image frames based on the determined mean of the frame units.

29. The article of claim 28, wherein a mean difference value based on determined mean of the frame units and a predefined coefficient is added to each frame unit of the corresponding image frame.

30. The article of claim 29, wherein the predefined coefficient is about 150 based on sensor testing and characterizations.

31. The article of claim 28, wherein the threshold value is determined by multiplying the determined standard deviation by a second constant value.

32. The computer-program product of claim 31, wherein the second constant value is around 6.

33. The article of claim 25, wherein light scattering effects are removed from the enhanced image frame based upon light scattering properties.

34. The article of claim 33, wherein the light scattering properties include light scattering effects of the frame units upon all other frame units based upon distance between the respective frame units.

35. The article of claim 34, wherein removing the light scattering effects includes:
   a) calculating an average value of frame units within the determined region of interest;
   b) generating a second image frame by removing the calculated average value from each of the frame units of the enhanced first image frame;
   c) separating the second image frame into a plurality of subarrays;
   d) generating a total for each subarray by adding frame units of the respective subarray;
   e) determining a distance of a frame unit of the second image frame from one of the subarrays;
   f) determining the light scattering effect of the subarray upon the frame unit based upon the determined distance of the frame unit from the subarray and predetermined light scattering characteristics;
   g) generating a subarray light scattering effect by multiplying the determined light scattering effect by the generated total of the associated subarray;
   h) repeating e)-g) for all the subarrays;
   i) generating a subarray effects total by adding all the generated subarray light scattering effects;
   j) generating a final frame unit by subtracting the generated subarray effects total from the respective frame unit; and
   k) repeating e)-j) for all the frame units of the second image frame.

36. A method for removing light scattering effects from an image frame generated by a digital sensor, the method comprising:
   a) receiving a first image frame from the digital sensor;
   b) calculating an average value of frame units within a predetermined region of interest of the received image frame;
   c) generating a second image frame by removing the calculated average value from each of the frame units of the first image frame;
   d) separating the second image frame into a plurality of subarrays;
   e) generating a total for each subarray by adding frame units of the respective subarray;
   f) determining a distance of a subarray from a frame unit;
   g) determining light scattering effects based upon the determined distance and predetermined light scattering characteristics;
   h) generating a subarray light scattering effect by multiplying the determined light scattering effect by the generated total of the associated subarray;
   i) repeating f)-h) for processing all the subarrays;
   j) generating a subarray effects total by adding all the generated subarray light scattering effects;
   k) generating a final frame unit by subtracting the generated subarray effects total from the respective frame unit; and
   l) repeating f)-k) for processing all the frame units of the second image frame.

37. A system for removing light scattering effects from an image frame generated by a digital sensor, the system comprising a processor including:
   a first component configured to receive a first image frame from the digital sensor, a plurality of image frames exposed to light below a first predefined luminance level, and a plurality of image frames exposed to light above a second predefined luminance level;
   a second component configured to calculate an average value of frame units within a predetermined region of interest of the first image frame;
   a third component configured to generate a second image frame by removing the calculated average value from each of the frame units of the first image frame;
   a fourth component configured to separate the second image frame into a plurality of subarrays;
   a fifth component configured to generate a total for each subarray by adding frame units of the respective subarray;
   a sixth component configured to determine a distance of a frame unit of the second image frame from one of the subarrays;
   a seventh component configured to determine the light scattering effect of the subarray upon the frame unit based upon the determined distance of the frame unit from the subarray and predetermined light scattering characteristics;
   an eighth component configured to generate a subarray light scattering effect by multiplying the determined light scattering effect by the generated total of the associated subarray;
   a ninth component configured to return to the sixth component until all the subarrays have been analyzed;
   a tenth component configured to generate a subarray effects total by adding all the generated subarray light scattering effects;
   an eleventh component configured to generate a final frame unit by subtracting the generated subarray effects total from the respective frame unit; and
   a twelfth component configured to return to the sixth component for processing all the frame units of the second image frame.

38. An article comprising a computer readable medium and a computer-program product residing on the computer readable medium for removing light scattering effects from an image frame generated by a digital sensor, the computer-program product including:
   a first component configured to receive a first image frame from the digital sensor; a plurality of image frames exposed to light below a first predefined luminance level, and a plurality of image frames exposed to light above a second predefined luminance level;
   a second component configured to calculate an average value of frame units within a predetermined region of interest of the first image frame;
   a third component configured to generate a second image frame by removing the calculated average value from each of the frame units of the first image frame;
   a fourth component configured to separate the second image frame into a plurality of subarrays;

a fifth component configured to generate a total for each subarray by adding frame units of the respective subarray;

a sixth component configured to determine a distance of a frame unit of the second image frame from one of the subarrays;

a seventh component configured to determine the light scattering effect of the subarray upon the frame unit based upon the determined distance of the frame unit from the subarray and the light scattering effects;

an eighth component configured to generate a subarray light scattering effect by multiplying the determined light scattering effect by the generated total of the associated subarray;

a ninth component configured to return to the sixth component for all the subarrays;

a tenth component configured to generate a subarray effects total by adding all the generated subarray light scattering effects;

an eleventh component configured to generate a final frame unit by subtracting the generated subarray effects total from the respective frame unit; and a twelfth component configured to return to the sixth component for processing all the frame units of the second image frame.

\* \* \* \* \*

UNITED STATES PATENT AND TRADEMARK OFFICE
CERTIFICATE OF CORRECTION

PATENT NO. : 7,626,632 B2 Page 1 of 1
APPLICATION NO. : 10/611702
DATED : December 1, 2009
INVENTOR(S) : Turner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1857 days.

Signed and Sealed this

Second Day of November, 2010

David J. Kappos
*Director of the United States Patent and Trademark Office*